United States Patent

Stewart et al.

(10) Patent No.: US 7,569,028 B2
(45) Date of Patent: Aug. 4, 2009

(54) FLUID FLOW ADJUSTMENT MECHANISM

(75) Inventors: Neil G. Stewart, Olds (CA); Gordon M. Day, Calgary (CA)

(73) Assignee: Flexcorp, Calgary, Alberta (CA)

( * ) Notice: Subject to any disclaimer, the term of this patent is extended or adjusted under 35 U.S.C. 154(b) by 0 days.

(21) Appl. No.: 10/268,690

(22) Filed: Oct. 11, 2002

(65) Prior Publication Data

US 2003/0071233 A1  Apr. 17, 2003

Related U.S. Application Data

(60) Provisional application No. 60/328,421, filed on Oct. 12, 2001.

(51) Int. Cl.
*A61M 1/00* (2006.01)

(52) U.S. Cl. .................. 604/33; 604/34; 433/100; 251/7; 251/8

(58) Field of Classification Search .......... 604/245, 604/246, 236, 30, 31, 33, 34, 67, 153, 118–120, 604/248, 249; 128/DIG. 12, DIG. 13; 251/4, 251/6–10; 417/474; 137/315.07; 433/28, 433/84, 85, 87, 98, 100
See application file for complete search history.

(56) References Cited

U.S. PATENT DOCUMENTS

| | | | |
|---|---|---|---|
| 2,503,327 A | 4/1950 | Fields | |
| 2,825,333 A | 3/1958 | Broman | |
| 2,889,848 A | 6/1959 | Redmer | |
| 3,285,563 A * | 11/1966 | Clarkson | 251/8 |
| 3,584,830 A * | 6/1971 | Koehn | 251/8 |
| 3,598,288 A * | 8/1971 | Posgate | 222/644 |
| 3,624,800 A * | 11/1971 | Swick | 251/4 |
| 3,848,634 A * | 11/1974 | Noiles | 137/601.03 |
| 3,985,134 A * | 10/1976 | Lissot et al. | 604/6.05 |
| 3,990,662 A * | 11/1976 | Wallace | 248/74.1 |
| 3,998,364 A * | 12/1976 | Hollander | 222/511 |
| 4,128,326 A * | 12/1978 | Selak | 396/611 |
| 4,312,493 A * | 1/1982 | Stauffer | 251/8 |
| 4,355,783 A * | 10/1982 | Morin | 251/9 |
| 4,368,851 A * | 1/1983 | Karlan | 239/581.2 |
| 4,576,593 A * | 3/1986 | Mommer | 604/250 |
| 4,753,371 A * | 6/1988 | Michielin et al. | 222/144.5 |
| 4,766,558 A * | 8/1988 | Luks et al. | 700/265 |
| 4,769,004 A * | 9/1988 | Poindexter | 604/33 |
| 4,787,406 A * | 11/1988 | Edwards et al. | 137/1 |
| 4,978,100 A * | 12/1990 | Peurifoy | 251/8 |
| 5,000,419 A * | 3/1991 | Palmer et al. | 251/9 |
| 5,013,006 A * | 5/1991 | Furuse | 251/8 |
| 5,046,486 A * | 9/1991 | Grulke et al. | 601/161 |

(Continued)

OTHER PUBLICATIONS

Barnes, Edward. Patent Specification 1,381,801. Published Jan. 29, 1975.*

*Primary Examiner*—Nicholas D Lucchesi
*Assistant Examiner*—Laura A Bouchelle
(74) *Attorney, Agent, or Firm*—Freedman & Associates

(57) ABSTRACT

A fine flow pinch adjust has a T shaped fluid communication path. A flexible tube is inserted within the fluid communication path in other than a straight path. A screw is inserted in one branch of the T unoccupied by the flexible tubing such that the screw cooperatively engages threads on the opening wall and such that the screw can engage the tubing when turned sufficiently in a known direction.

13 Claims, 10 Drawing Sheets

U.S. PATENT DOCUMENTS

| | | | |
|---|---|---|---|
| 5,154,704 A | * | 10/1992 | Archibald .................... 604/250 |
| 5,197,708 A | * | 3/1993 | Campau ........................ 251/8 |
| 5,215,450 A | * | 6/1993 | Tamari ........................ 417/474 |
| 5,241,985 A | | 9/1993 | Faust et al. |
| 5,259,587 A | | 11/1993 | D'Alessio et al. |
| 5,351,932 A | * | 10/1994 | von Herrmann ................ 251/4 |
| 5,411,482 A | * | 5/1995 | Campbell .................... 604/153 |
| 5,593,392 A | | 1/1997 | Starchevich |
| 5,921,443 A | * | 7/1999 | McMillan .................... 222/174 |
| 6,082,702 A | * | 7/2000 | Campau ........................ 251/8 |

* cited by examiner

FLUID FLOW ADJUSTMENT MECHANISM

This application claims the benefit of U.S. Provisional Patent application No. 60/328,421 filed Oct. 12, 2001.

FIELD OF THE INVENTION

The present invention relates to a flow regulator for regulating the flow rate through a flexible tube and more specifically to a mechanism that laterally pinches a flexible tube for a fine adjustment of the flow.

BACKGROUND OF THE INVENTION

Modern medical treatments often involve the use of intravenous fluids. The fluids may contain a wide variety of agents that affect the patient. The flow rate of medical fluid provided to the patient is critical in order to ensure that the patient is properly treated. Thus, it is important to provide a simple mechanism for adjusting the flow of a liquid in a tube. In U.S. Pat. No. 4,515,588, filed 16 May 1983, Amendolia suggests inserting an adjustable valve in the fluid path to control the flow rate. This prior art works with flexible plastic tubing. The tube is cut and an adjustable valve is inserted. The valve permits fine flow adjustment. Clearly, when such a valve is used, it is necessary to ensure that the sterilized plastic hose remains free of germs. Thus, a sterilized knife is used to cut the tubing. Clearly, the knife must be used immediately if it is to remain sterile. Although the tasks of cutting the tubing and inserting the flow regulator are relatively simple they take time and in a hospital environment, time is very costly.

Alternatively, in U.S. Pat. No. 3,215,394, filed 23 Apr. 1962, Sherman describes a simple method of controlling the flow of liquid in a flexible plastic tube by deforming the tube. The Sherman prior art relies on a cam that receives an external rotational input in order to interfere with the geometry of flexible tubing that the liquid flows through. This prior art does not require that the flexible plastic tubing be cut in order to control the flow of liquid therein. Unfortunately, the degree of control over the flow rate is poor. The device is simple however the variety of parts needed to build it and the assembly of those parts leads to a device that is fairly costly.

In U.S. Pat. No. 4,786,028, filed 24 Feb. 1987, Hammond describes a fluid flow adjustment mechanism much like the mechanism of the Sherman prior art. Hammond however inserts a block between the cam and the flexible tubing. This reduces the likelihood of wear on the tubing substantially, however the device does not provide the precise flow desired and demanded in a wide variety of medicinal applications.

This device is improved upon by D'Alessio et al. in U.S. Pat. No. 5,259,587 in which a fluid control mechanism is provided using a cylinder as a cam that pushes a surface of a second cylinder against a flexible tube. In this case, the deformation of the tube is controlled using a wheel with a ratchet mechanism. The ratchet prevents the cam from rotating out of position once it has been set. Although this mechanism offers a somewhat improved flow control mechanism over the related prior art, it also introduces additional components. Clearly, the components used will require some assembly and that cost will be apparent in the cost of the device.

Thus, a variety of prior art devices exist featuring a ram that moves perpendicular to a tube to deform the tube in order to adjust a flow of fluid within the tube. These devices are generally designed to work with special flexible tubing. The flexibility of flexible tubing is described by a durometer rating. A typical durometer rating of flexible tubing used in fluid flow adjustment devices for dental applications is 60 to 80 on a Shore A scale. This type of tubing is quite flexible and therefore relatively easy to deform. Harder tubing having Shore A durometer ratings of 85 and 90 are also quite common; however, these stiffer types of tubing are less well suited to use with this type of prior art device as they require substantially more effort to produce the desired deformation.

An alternative design causes three points bending in a flexible tube in order to control a flow of fluid therein. Thus, the flexible tubing is held by two supports and ram engages the tubing between the supports. The degree of engagement of the ram affects the fluid flow within the tube. Unfortunately, this method does not provide precise flow control.

Ideally, these devices would provide a more linear relationship between the position of an input control and the flow mechanism. For example, when the input is halfway between the fully open position and the fully closed position ideally the flow provided would be half the flow associated with the fully open position. Thus, the position of the input would be directly proportional to the flow of liquid that the mechanism provides.

Ideally, a flow regulator should provide a consistent and directly proportional relationship between the displacement of an input and the flow rate. However, a consistent flow rate is not obtained with many of the prior art flow rate regulators because the pressure exerted on the wall of a flexible tubing is perpendicular to the fluid flow, which modifies the shape of the internal surface of the tubing without substantially modifying the flow of the fluid. A deformation from, for example, a circular shape to a somewhat elliptical shape does not change the flow substantially, even though a certain displacement is imposed on the wall of the flexible tubing to achieve such a deformation.

Clearly, it would be beneficial to provide a fluid flow adjustment device that provides highly precise flow control by deforming a flexible tube. Additionally, it would be beneficial if the device is simple and easily produced using very inexpensive components.

OBJECT OF THE INVENTION

It is an object of this invention to provide a fine adjustment system for regulating a fluid flow passing through flexible tubing which does not require cutting the tubing.

It is an object of this invention to provide a fine flow pinch adjust system that permits an approximately consistent fine control of a flow rate.

SUMMARY OF THE INVENTION

The invention describes a fine flow pinch adjust mechanism comprising:

a channel for supporting a flexible tube bent by a fixed substantial angle at a first location; and, an opening for receiving a corresponding member and extending toward the first location, the opening for supporting controlled motion of the member in a direction toward and away from the first location.

Additionally, the invention teaches a fluid flow adjustment mechanism for controlling a fluid flow rate in a length of flexible tubing, comprising:

a housing having a surface for engaging the length of flexible tubing, the engagement of the surface with the length of flexible tubing supporting a substantial first bending deformation of the flexible tubing in a first portion of the length of flexible tubing, said first bending deformation occurring without preventing a flow of fluid within the flexible tubing; and, a ram mechanically engaged with said housing, the ram for selectably engaging the first portion to compress the first portion against the housing thereby causing a second deformation of the first portion in dependence upon the position of the ram.

In another embodiment of the invention there is provided a fine flow pinch adjust comprising:

a casing having:
    a second opening;
    a first threaded cylindrical opening opposite the second opening, the first and second openings in fluid communication with each other; and,
    a third opening in fluid communication with the first and second openings; and,
    a screw having a threading for engaging with a threading of the first threaded cylindrical opening and for moving in and out of the first threaded cylindrical opening in response to a rotation of the screw relatively to the first threaded cylindrical opening,
    wherein in use a flexible tube is positioned between the second and third openings in other than a straight path, the flexible tubing being engageable by the screw.

The invention also describes a fine flow pinch adjust mechanism for controlling a flow in a length of flexible tubing comprising:

means for supporting and bending a portion of the length of flexible tubing; and, means for selectably deforming the portion to control a rate of fluid flow therein absent substantially affecting the bending of the portion.

BRIEF DESCRIPTION OF THE DRAWINGS

Exemplary embodiments of the invention will now be described in conjunction with the following drawings, in which.

DETAILED DESCRIPTION OF THE INVENTION

Figure 1:
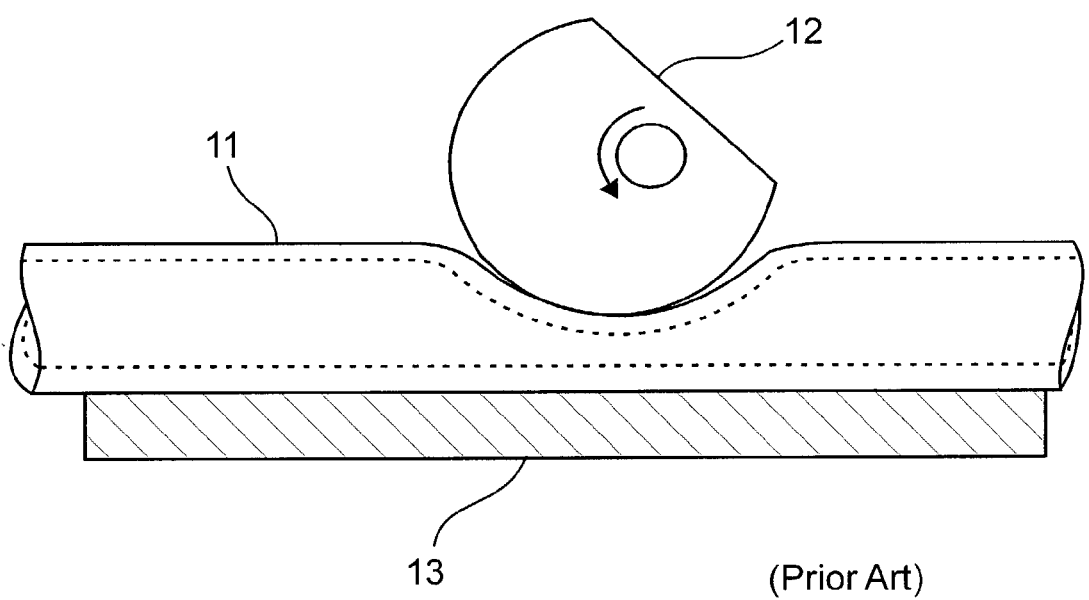
FIG. 1 is a section view of a prior art flow regulator that deforms a length of flexible tubing to affect the flow of liquid therein.
Figure 1A:
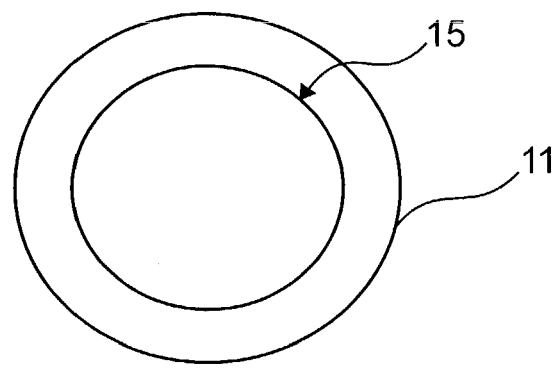
FIG. 1a is section view of an undeformed tube.
Figure 1B:
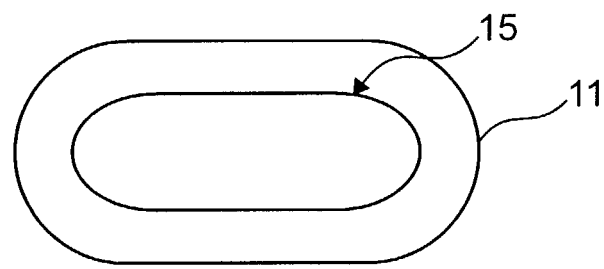
FIG. 1b is a section view of tube after a substantial deformation from an undeformed state.

Referring to FIG. 1, a section view of a fluid flow control mechanism according to the prior art of Sherman as disclosed in U.S. Pat. No. 3,215,394 is shown. This prior art device controls the flow of liquid in a tube 11 by compressing the tube 11 between a cam 12 and a housing 13. Referring to FIG. 1a, a cross section view of a tube 11 is shown. The tube 11 has a circular outside diameter with a circular bore 15 concentric with the outside diameter. The section view shown in FIG. 1a is consistent with a flexible tube used in the mechanism described in FIG. 1 with the section view in which the cam 12 does not cause deformation of the tubing 11. As the cam 12 is displaced into the tube 11 by a small amount it deforms the tube 11 slightly. Referring to FIG. 1b, the flexible tube is shown having been slightly deformed with respect to the section view of FIG. 1a. Although the bore of the tube is now somewhat deformed, the cross sectional area of the bore has not changed significantly. Consequently, the flow rate within the tube 11 is not changed significantly, either.

Figure 1C:
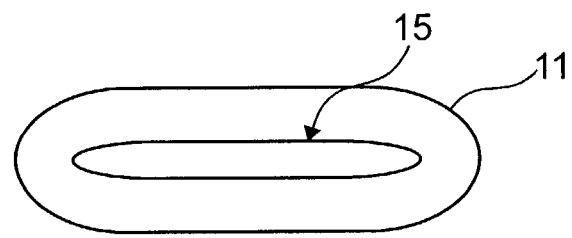
FIG. 1c is a section view of a tube sufficiently deformed to affect a flow of fluid therein.
Figure 1D:
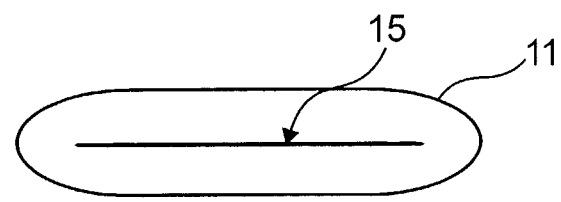
FIG. 1d is a section view of the tube shown in FIG. 1c after a further substantial deformation.

Referring to FIG. 1c, a cross section view of the tube shown in FIG. 1 proximate the cam 12 is shown. The cam 12 has been brought down and the tube 11 has been deformed, thereby affecting the flow rate within the tube 11. As the cam 12 is brought down a same small amount, as described with reference to the paragraph associated with FIG. 1a, the bore of the tube is narrowed significantly. Referring to FIG. 1d, the cross section view of the tube shown in FIG. 1c is shown after a small displacement of the cam 12. It is apparent that the cross sectional area of the bore has been reduced significantly as a result of the small displacement of the cam. A person of skill in the art will realize that such a displacement would likely have a substantial effect on the flow rate within the bore of the tube. Clearly, unless the fluid flow control mechanism is intended as a valve with an open state and a closed state, a more consistent and even response between a change in position of the member used to deform the tube and flow rate within the tube is desirable.

Figure 2:
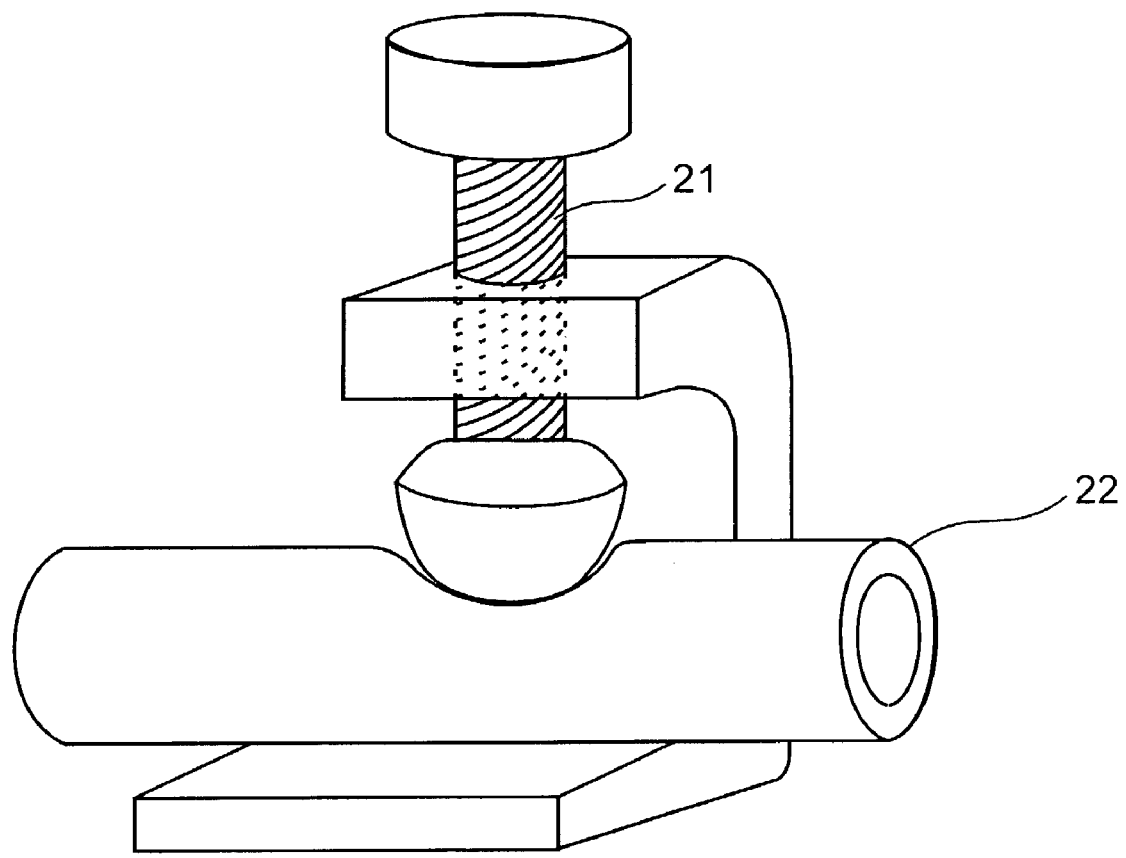
FIG. 2 is an isometric view of a prior art fluid flow adjustment device with a threaded ram mounted perpendicularly to a flexible tube.

An alternative to the prior art of Sherman is shown in FIG. 2. It incorporates a simpler mechanism in which a screw 21 is used to deform the flexible tubing 22 instead of a cam. Although the screw 21 provides finer adjustment than the device incorporating a cam, this device also has similar sensitivity problems as discussed with respect to the prior art of Sherman. Additionally, it is not uncommon that when a hand operated screw mechanism is used to deform the flexible tubing and the flow is stopped, a considerable torque is necessary in order to move the screw 21 backward to permit a fluid flow. This problem is generally known as stiction. Once the stiction torque has been overcome the screw is very easy to rotate. Unfortunately, when this mechanism is used with small diameter tubing typical of medical applications it is not uncommon that the working range of the screw 21 is about one quarter turn. Consequently, when a health care professional chooses to permit a minimal fluid flow from such a device that has been set to prevent fluid flow it is not uncommon that the initial fluid flow is excessive until the device is properly adjusted. Typically, these devices use a UNC#10-32 screw because they are very robust, commercially available and inexpensive. This type of screw has a thread pitch of 32 threads per inch. While it is certainly possible to create screws having finer threads allowing a greater working range of the mechanism the finer threads are not commonly available and substantially more difficult to produce, particularly in molded plastics thus leading to higher manufacturing costs.

Figure 3:
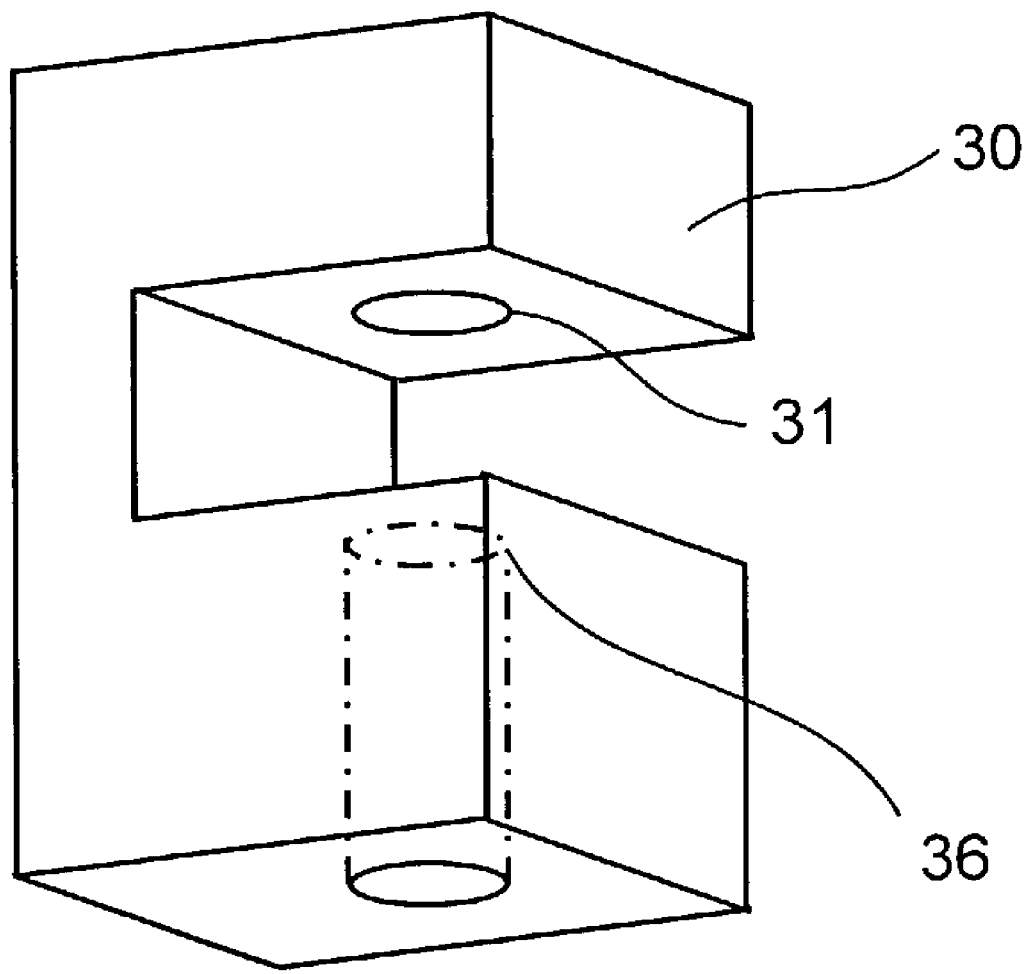
FIG. 3 is a schematic diagram of a fluid flow adjustment mechanism according to an embodiment of the present invention.

Referring to FIG. 3, a schematic diagram of a fluid flow adjustment mechanism according to a first embodiment of the invention is shown. The mechanism includes a housing 30 with a threaded hole 31. The housing 30 also has a surface with a corner feature 36 for supporting flexible tubing. The surface of the corner feature 36 is shaped to cause a substantial bend in a length of flexible tubing supported therein proximate the first opening 31.

Figure 4:
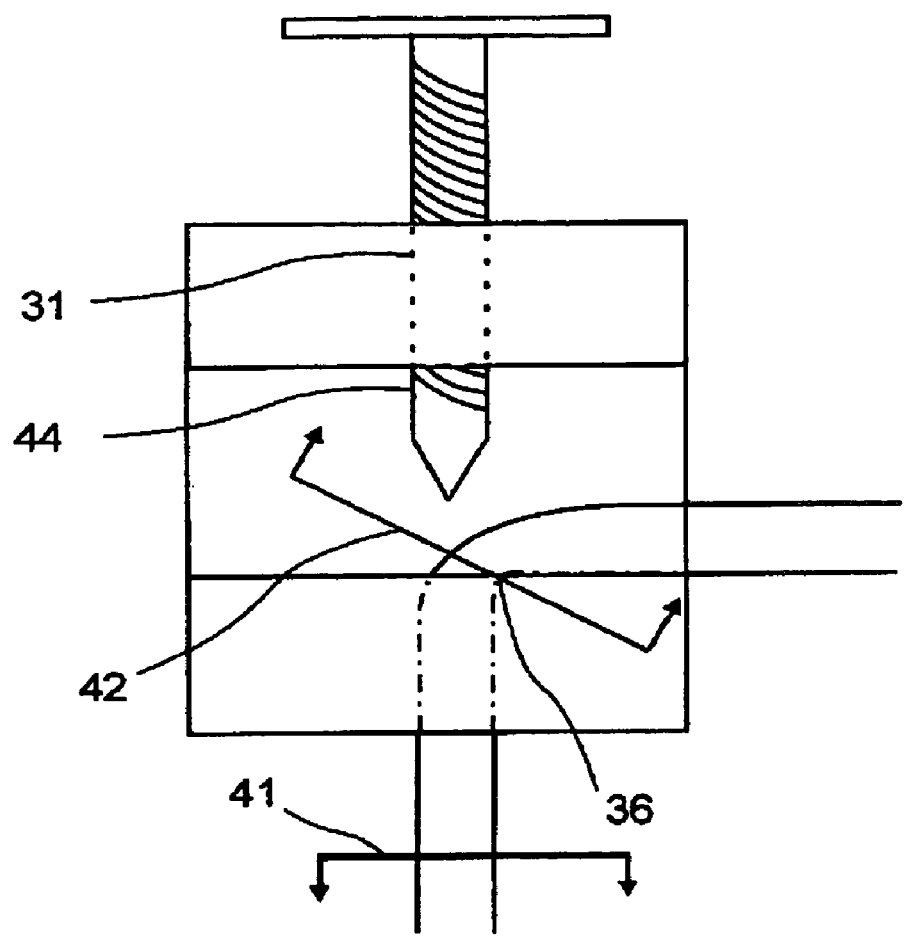
FIG. 4 is a representative section view of a fluid flow adjustment mechanism according to an embodiment of the present invention featuring a flexible tube and a threaded ram.

Referring now to FIG. 4, a side view of the fluid flow adjustment mechanism of FIG. 3 is shown with a length of flexible tubing 40 supported by the surface of the corner feature 36 and a screw 44 engaged into the threaded hole 31. The flexible tubing 40 is shown with a first section line 41 and a second section line 42. Section line 42 is present in a region where the flexible tubing is supported by the corner feature 36 while section line 41 corresponds to a region of the flexible tubing in which the cross section of the tube is not substantially deformed.

Figure 4A:
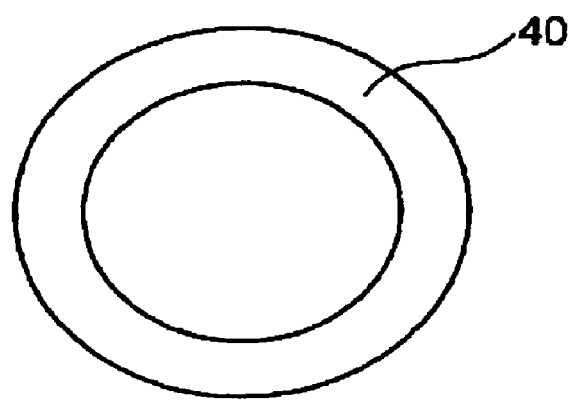
FIG. 4a is a cross section view of a length of flexible tubing absent deformation.
Figure 4B:
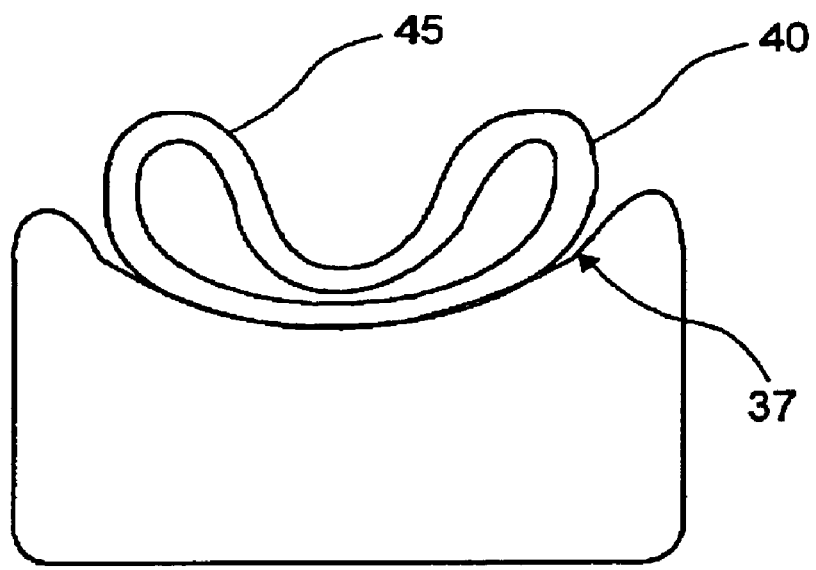
FIG. 4b is a cross section view of a length of flexible tubing that is deformed as a result of contact with a curved flange.

Referring to FIG. 4a, a cross section view of a length of flexible tubing 40 corresponding to section line 41 of FIG. 4. In such a region, the external diameter of the tubing 40 is circular. In this case, the tubing has a substantially equal wall thickness and as a result, the interior diameter of the tubing is also circular. Referring now to FIG. 4b, a section view corresponding to section line 42 of FIG. 4 is shown. The surface 37 of the corner feature substantially deforms the flexible tubing 40. The resulting cross section of the flexible tubing provides a bore having bulges 45 at either side. Clearly, in this configuration, most of the fluid flow will occur proximate the bulges 45, with less fluid flow proximate the middle of the tubing.

Figure 5:
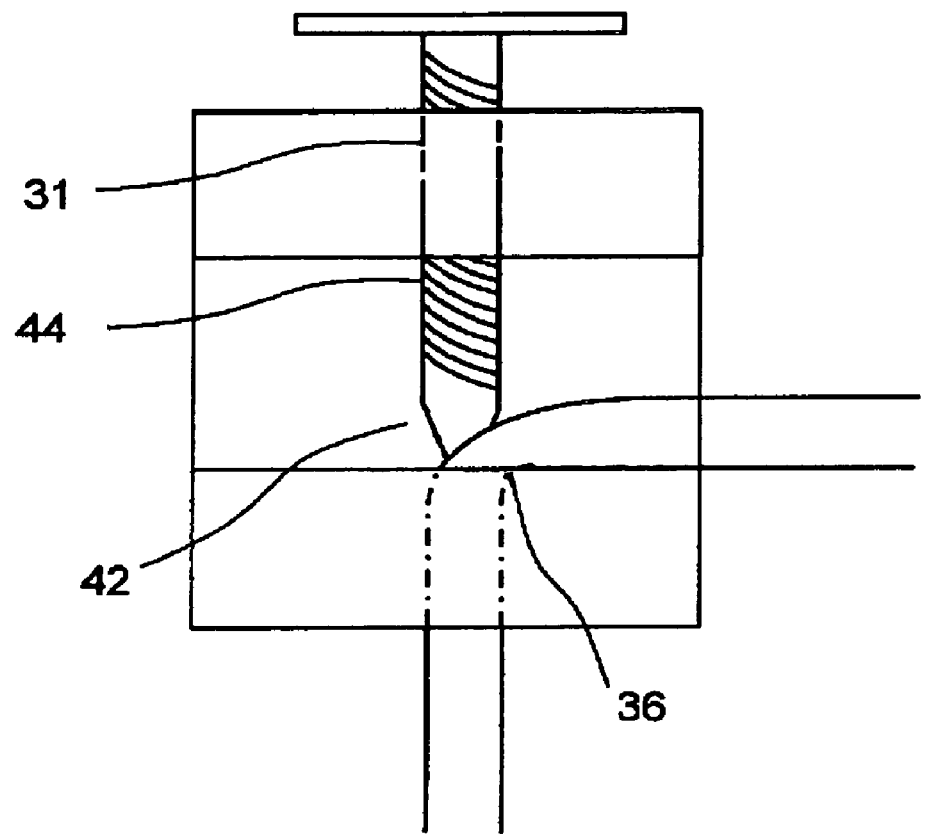
FIG. 5 is a representative section view of a fluid flow adjustment mechanism according to a preferred embodiment of the present invention in which a length of flexible tubing is being deformed thereby restricting a flow of liquid.
Figure 5A:
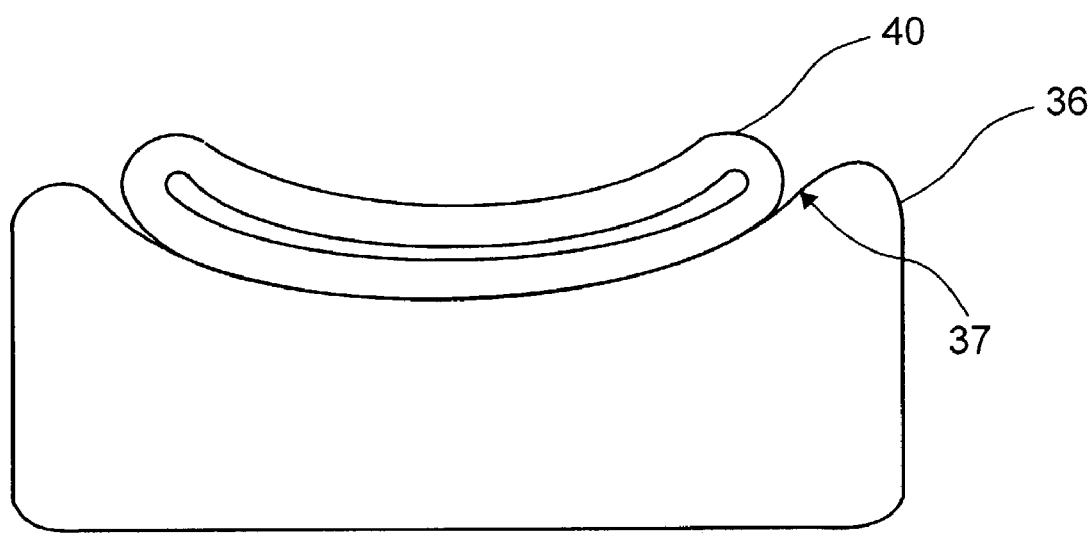
FIG. 5a is a section of tubing deformed by a mechanism consistent with the preferred embodiment of the invention.

Referring now to FIG. 5, the fluid flow adjustment mechanism of FIG. 4 is shown with the tapered end of a screw 44 in contact with the flexible tubing 40. When the screw 44 further compresses and deforms the flexible tubing 40, the cross sectional area of the interior of the tubing 40 is reduced. Referring to FIG. 5a, the reduction of the interior cross section area of the tubing 40 is approximately proportional to the travel of the screw 44. When the screw 44 is properly engaged with the flexible tubing 40, the flow of liquid within the flexible tubing 40 is affected in an approximately linear relationship with the position of the screw 44. The angle of the taper on the tapered end of the screw 44 affects the distance that the screw 44 travels to go from a first state of not contacting the flexible tube 40 to another state of substantially preventing flow within the flexible tube 40. As a result, when the taper is properly chosen, a relatively coarse rotation of the bolt results in a relatively fine adjustment of the flow within the flexible tubing despite the use of standard threads on the bolt, such as UNC#10-32. Further, since the screw 44 is not being pushed directly into the tube 40 this design reduces the likelihood of the screw 44 sticking to the tube 40. In the unlikely event that the screw 44 does stick to the tubing 40 a twist of the screw 44 with sufficient torque will likely still cause a larger than necessary twisting of the screw 44. Fortunately, the taper of the screw 44 is easily chosen to permit a substantial rotation of the screw in to position permitting a negligible flow from a fully closed position. Therefore, even with some small rotation associated with overcoming stiction a large fluid flow need not be produced.

It will be apparent to one of skill in the art of mechanical design that the embodiment of the invention shown in FIG. 5 is very easily produced. Additionally, since the assembly of the device comprises positioning a tube in a housing, inserting a screw into the housing and rotating the screw, it is apparent that the device is optionally provided as a set of discrete components that are easily assembled immediately before use. A wide variety of materials are suitable for the housing. The housing is easily produced by molding or casting, both of these techniques are well known in the art for producing robust components that are very cost effective in large volumes. Clearly, the production of the device according to the invention is in no way limited to these techniques as the device is easily produced, for example, by machining rod material or other standard size stock. Additionally, the screw is easily produced using known techniques. Thus, the fluid flow regulator according to the embodiment of FIG. 5 is exceptionally cost effective while providing a quality of fluid flow rate control that is more than adequate for many applications.

Figure 6:
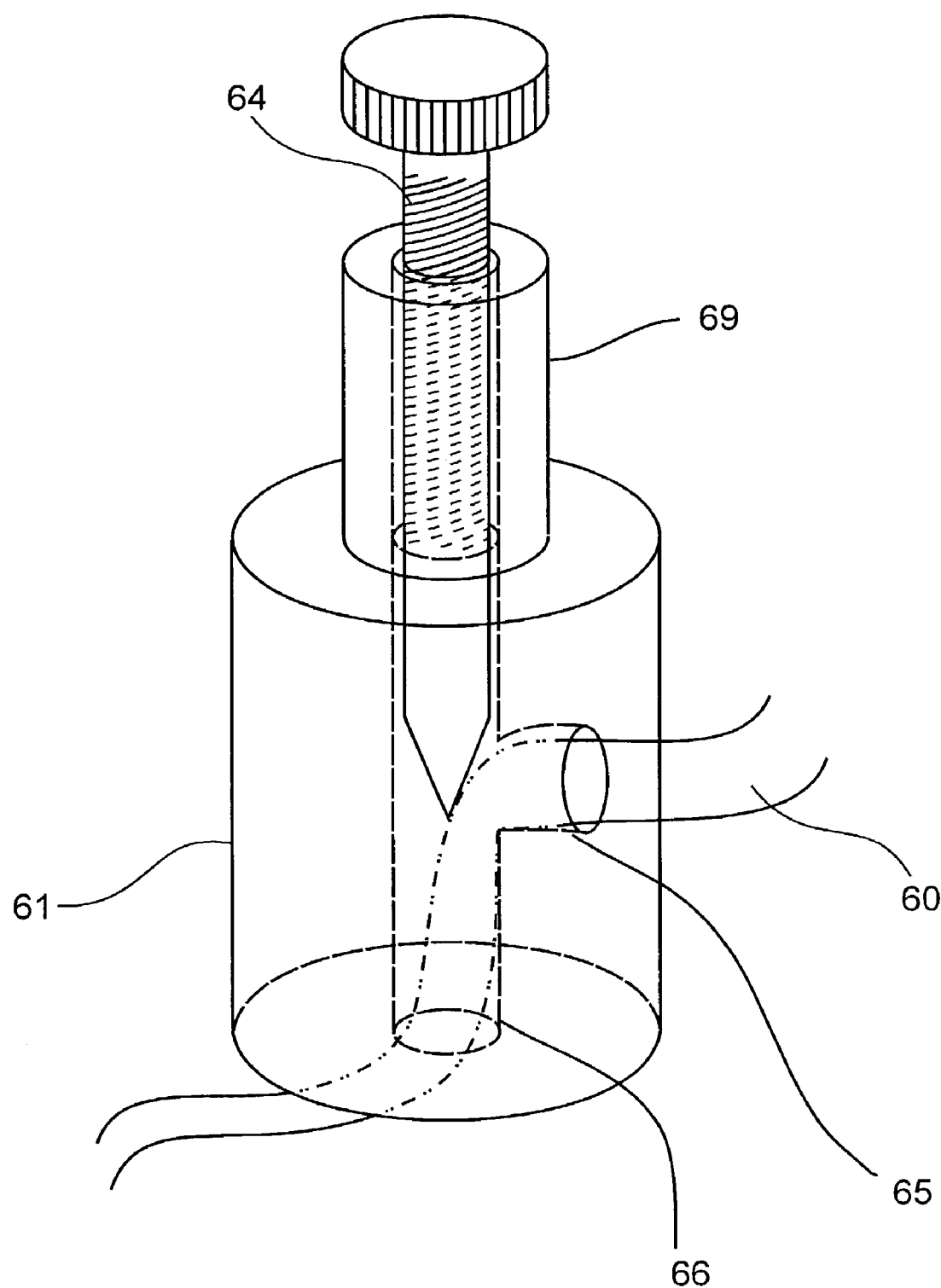
FIG. 6 is a hidden line view of an embodiment of the invention.

A wide variety of variations to this basic design are possible. As shown in FIG. 6, a second embodiment of a flow regulator according to the invention is shown. This embodiment features a threaded outside portion 69 that assists mounting of the flow regulator in a panel. In this embodiment, a corner feature 62 is provided in a housing 61. In this case, the corner feature is formed by the intersection of a first circular bore 65 and a second circular bore 66. A tapered bolt 64 is engaged with a threaded portion of the second bore 66. A length of tubing 60 is provided in the continuous channel as shown and secured therein. The tapered bolt 64 provides pressure on the tubing 60 in dependence upon the position of the tapered bolt 64 relative to the tubing 60. In this embodiment, an end of the tubing 60 is provided to the first bore 65 and pushed through the second bore 66. In this embodiment of the invention, the molded plastic housing 61 has a substantial amount of material in the region between the threaded section of the housing 61 and the corner feature. The presence of this material results in the housing being very strong. Thus, this configuration permits the use of relatively weak materials for the housing 61, without compromising the structural integrity of the finished device. In this embodiment of the invention, the tapered bolt 64 has been chosen such that the outside diameter of the tapered bolt 64 is marginally smaller than the inside diameter of the second bore 66 proximate the intersection of the first bore 65 and the second bore 66. This geometry helps to support the tapered bolt 64. Thus, the axis of rotation of the tapered bolt 64 is positioned at the centerline of the second bore, even if the threaded engagement between the tapered bolt 64 and the housing 61 is sufficiently loose to permit some slop. Therefore, when the tapered bolt 64 deforms the flexible tubing 60, the flexible tubing will not bend the tapered bolt 64. This also permits the use of stiffer flexible tubing than would ordinarily be associated with a simple fluid flow adjustment device. Devices built according to this embodiment of the invention have been successfully used with flexible tubing having a Shore A durometer rating of 85 to 90. In the embodiment according to FIG. 6 the first bore 65 and the second bore 66 are shown having a same diameter although alternative embodiments may feature different diameters for the different bores. Clearly, a wide variety of materials are suitable for the different components of the device.

Figure 7:
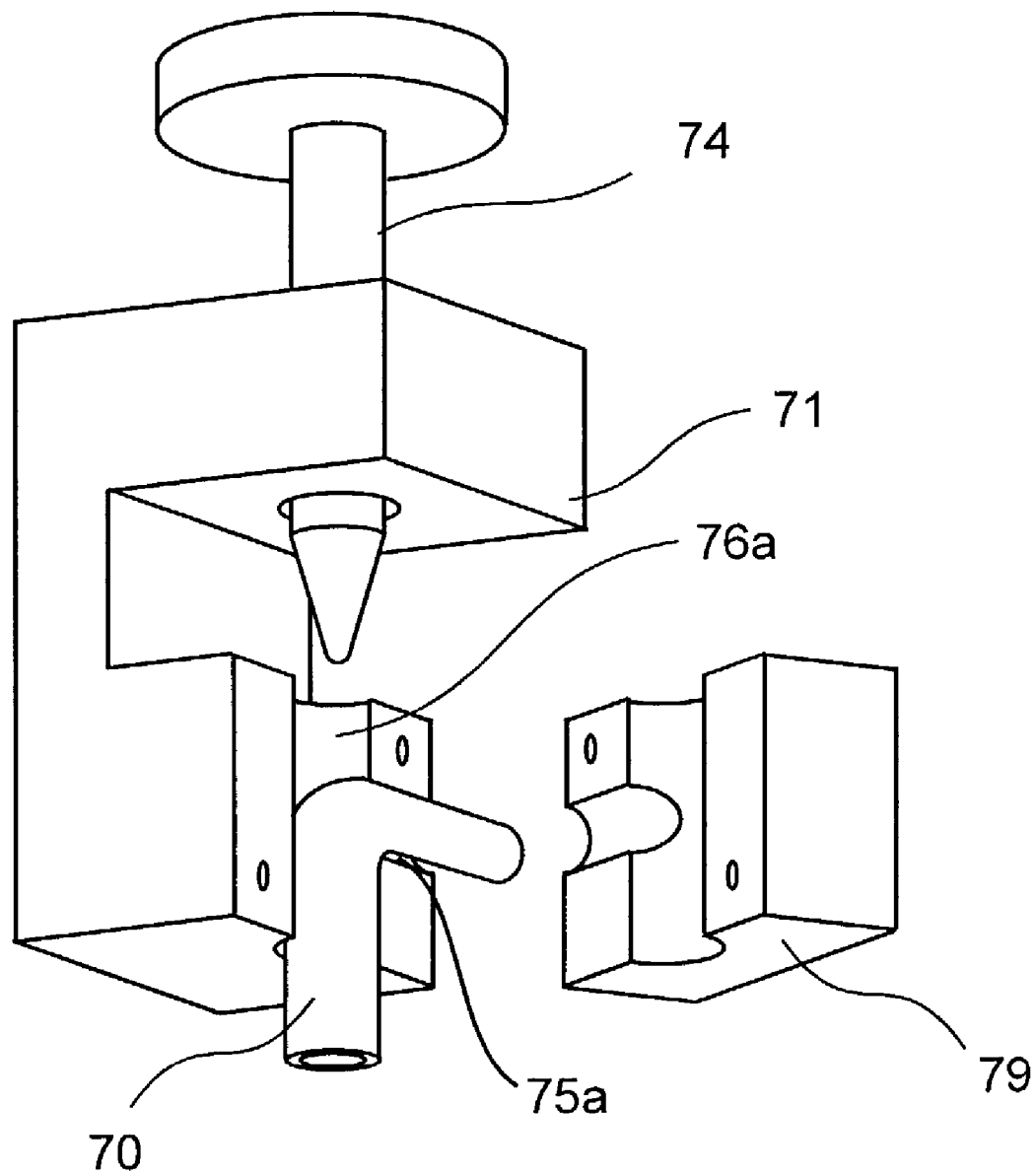
FIG. 7 is a isometric view of an embodiment of the invention with a removable section for quick installation; and, FIG. 8 is an isometric view of a panel supporting a plurality of fluid flow adjustment mechanisms according to the invention.

Referring to FIG. 7, an embodiment of the invention is shown having a panel to permit easy access to the channel used for supporting the flexible tubing. The device according to this embodiment comprises: a threaded member 74, a main housing 71, a panel 79 and a length of flexible tubing 70. The main housing 71 has a first channel 75a formed therein and a second channel 76a formed therein. Concentric to the second channel 76a is a threaded hole for supporting the threaded member 74. In use, a length of flexible tubing 70 is provided to the main housing 71. The flexible tubing 71 is deformed so that it is supported by both the first channel 75a and the second channel 76a, with the flexible tubing 70 properly positioned and the panel 79 positioned and engaged with the main housing 71. The threaded member 74 is then engaged with the threaded hole of the main housing 71. This embodiment of the invention permits the use of the invention with a length of tubing absent the need to feed the tubing through the device. This is beneficial for example in an industrial environment in which a variable flow rate mechanism has failed such that it no longer serves to restrict the flow of a fluid. The failed mechanism is critical to the operation of a production and thus, the production line is unable to function properly. The device according to this embodiment of the invention is easily coupled to a length of flexible tubing to establish control of the flow rate within the tubing. This embodiment is easily attached to the flexible tubing without the need to empty the tubing or disconnect the tubing. This embodiment features a fluid flow rate adjustment mechanism consistent with the previous flow rate mechanism of the previous embodiment. Optionally, the panel 79 includes a third channel feature and a fourth channel feature that work in co-operation with the first channel feature 75a and the second channel feature 76a of the main housing 71. The panel 79 shown in FIG. 7 is shown secured to the main housing 71 with a screw but this need not be the case. In an alternative embodiment panel 79 has a spring-loaded members that snap into corresponding features of the main housing 71. Optionally, the attachment of the panel is permanent. Clearly, a person of skill in the art of mechanical design will be aware of a wide variety of techniques available for attaching two parts together for either permanent or temporary engagement.

Figure 8:
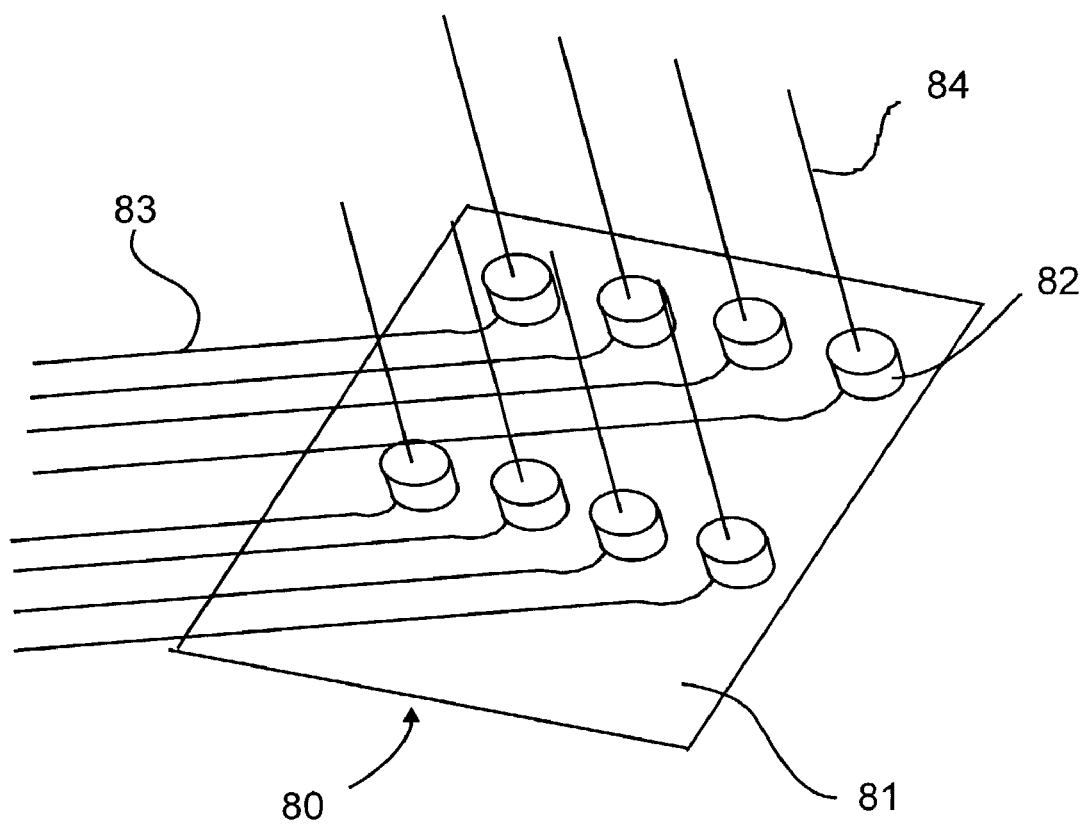

Referring to FIG. 8, a panel of fluid flow adjustment mechanisms according to the invention is shown. The panel 80 has a first surface 81 for supporting a plurality of flow regulators 82. Each of the flow regulators 82 has an input flexible tube 83 and an output flexible tube 84. The panel 80 is shown supporting only eight flow regulators 82 for illustrative purposes. Clearly, the panel is easily modified to support different numbers of flow regulators. One primary concern when producing a panel 80 of this type is the routing of the tubing. Clearly, routing sixteen lengths of flexible tubing as shown in FIG. 8 is not a significant problem however when hundreds of lengths of flexible tubing are used this often presents a problem. In this application, the tubing is bent approximately 90 degrees when it is installed in the housing of the flow regulator 82. Thus, a very quick inspection of the panel will verify which output flexible tube 84 is associated with which flow regulator 82. As previously described with reference to FIG. 6, embodiments of the invention are particularly well suited for use with flexible tubing which is stiffer than the flexible tubing normally associated with flow regulators that rely on deforming a length of flexible tubing. Thus, the likelihood of an individual length of tubing being inadvertently deformed is reduced.

Although the invention is well suited to controlling the flow of a medicinal fluid to a patient, a wide variety of other applications exist. A fluid flow adjustment mechanism according to the invention is equally well suited for use in a laboratory or industrial environment. Since the liquid whose flow is being controlled is not in contact with the fluid flow adjustment mechanism the mechanism need not be sterilized to ensure that it does not contaminate the liquid flow. Additionally, the design of the device permits scaling the embodiments of the invention to work with significantly larger flexible tubing.

The embodiments of the invention provide a very simple device for regulating a flow of liquid within a length of flexible tubing. The flow regulation is achieved with a highly controllable response to adjustments of an external input due to a substantial reduction in stiction. The fluid flow adjustment mechanism is easily and cost effectively produced from a wide variety of materials. Although embodiments of the invention feature tapered bolts that are rotated by a user to deform the flexible tubing, a wide variety of different options are available for deforming the flexible tubing. For example, a variable position solenoid is optionally incorporated to deform the plastic tubing in response to an electrical signal. Alternatively, a conventional bolt or a bolt with a ball nose is used in place of a tapered bolt.

A person of skill in the art of mechanical design will be aware of a variety of alternative embodiment of the invention. For example, the embodiments presented herein use a threaded member, such as a bolt with a smooth tip, to engage and deform the tube. This need not be the case. For example the invention will work with a variety of different elements to deform the flexible tubing, such as an appropriately shaped cam and tapered cylinder. Numerous other embodiments may be envisaged without departing from the spirit and scope of the invention.

What is claimed is:

1. A fluid flow adjustment mechanism for controlling a fluid flow rate in a length of flexible tubing, comprising:
   a housing comprising a corner feature engaging the length of flexible tubing, the corner feature for directing the length of flexible tubing through a substantial angle, the housing configured to retain the flexible tubing so directed, thereby resulting in a substantial change in cross sectional shape of a portion of the length of flexible tubing that is adjacent to the corner feature and without preventing a flow of fluid within the length of flexible tubing; and,
   a ram mechanically engaged with said housing, the ram for controllably compressing the portion of the length of flexible tubing against the corner feature as to further change the cross sectional shape of the portion of the flexible tubing for adjusting a rate of fluid flow therethrough, the ram having a first state in which the ram is other than in contact with the tubing and a second state in which the ram is in contact with the tubing, the ram other than perpendicular to the flexible tubing at a location where the ram contacts the flexible tubing when the ram goes from the first state to the second state.

2. A fluid flow adjustment mechanism according to claim 1, wherein the housing comprises a hole and the ram comprises a threaded portion engaged with the hole of the housing.

3. A fluid flow adjustment mechanism according to claim 2, wherein a rotation of the ram relative to the housing supports a change in the cross section shape of the portion of the flexible tubing.

4. A fluid flow adjustment mechanism according to claim 2 wherein the hole is a threaded hole.

5. A fluid flow adjustment mechanism according to claim 2, wherein the housing comprises a straight channel having two distal ends in which one of said distal ends comprises the corner feature.

6. A fluid flow adjustment mechanism according to claim 5 wherein a characteristic axis of the hole and a characteristic axis of the channel are parallel.

7. A fluid flow adjustment mechanism according to claim 6 wherein the characteristic axis of the hole and the characteristic axis of the channel are collinear.

8. A fluid flow adjustment mechanism for controlling a fluid flow rate in a length of flexible tubing, comprising:

a housing comprising a predetermined surface engaging the length of flexible tubing, the predetermined surface for directing the length of flexible tubing through a substantial angle, the housing configured to retain the flexible tubing so directed, thereby resulting in a substantial change in cross sectional shape of a portion of the length of flexible tubing that is adjacent to the predetermined surface and without preventing a flow of fluid within the length of flexible tubing; and, a ram mechanically engaged with said housing, the ram for controllably compressing the portion of the length of flexible tubing against the predetermined surface as to further change the cross sectional shape of the portion of the flexible tubing for adjusting a rate of fluid flow therethrough, the ram having a first state in which the ram is other than in contact with the tubing and a second state in which the ram is in contact with the tubing the ram other than perpendicular to the flexible tubing at a location where the ram contacts the flexible tubing when the ram goes from the first state to the second state.

9. A fluid flow adjustment mechanism according to claim 8, wherein the housing comprises a hole and the ram comprises a threaded portion engaged with the hole of the housing.

10. A fluid flow adjustment mechanism according to claim 9, wherein a rotation of the ram relative to the housing supports a change in the cross section shape of the portion of the flexible tubing.

11. A fluid flow adjustment mechanism according to claim 9 wherein the hole is a threaded hole.

12. A fluid flow adjustment mechanism according to claim 9, wherein the housing comprises a straight channel having two distal ends in which one of said distal ends comprises the corner feature.

13. A fluid flow adjustment mechanism according to claim 12 wherein the characteristic axis of the hole and the characteristic axis of the channel are collinear.

* * * * *